(No Model.)

G. W. cGILL.

STAPLE OR ⎵ FASTENER.

No. 249,851. Patented Nov. 22, 1881.

Witnesses.
Robert Everett
Vinton Coombs

Inventor:
George W. McGill.
By J. J. Coombs, Atty

UNITED STATES PATENT OFFICE.

GEORGE W. McGILL, OF NEW YORK, N. Y.

STAPLE OR TAG FASTENER.

SPECIFICATION forming part of Letters Patent No. 249,851, dated November 22, 1881.

Application filed September 27, 1881. (No model.)

*To all whom it may concern:*

Be it known that I, GEORGE W. MCGILL, a citizen of the United States, residing at New York city, in the county of New York and State of New York, have invented certain new and useful Improvements in Staple-Fasteners or Tag-Fastenings; and I do hereby declare the following to be a full, clear, and exact description of the invention, such as will enable others skilled in the art to which it appertains to make and use the same.

The object of this invention is to produce a cheap fastener for binding and ticketing silks, cloths, and other fibrous material, the shanks of which, in passing through the material, will not cut the fibers of the same, but merely push them aside.

It consists of a piece of flexible round wire, of suitable length and thickness, pointed at both ends, with its center portion inclosed in a metal casing or tube to give it rigidity, and its ends or uncovered parts bent down at right angles from its covered center to form its penetrating-shanks.

Figure 1:
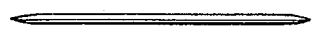
Figure 2:
Figure 3:
Figure 4:
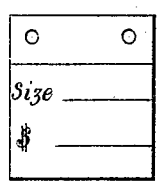
Figure 5:
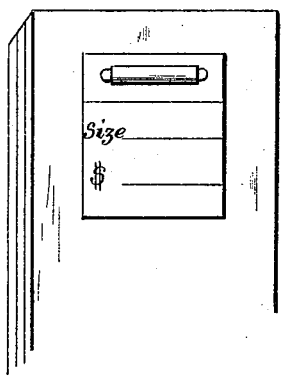
Figure 6:
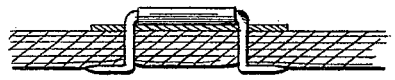
Figure 7:
Figure 8:
Figure 9:
Figure 10:
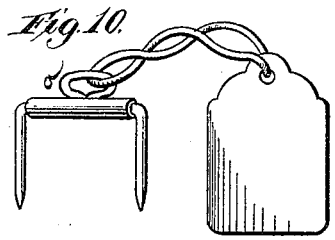
Figure 11:
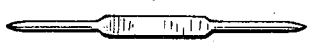
Figure 12:
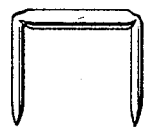
Figure 13:

In the drawings, Figure 1 represents the round and pointed flexible-wire blank. Fig. 2 represents, in blank, the center stiffening-tube. Fig. 3 represents the wire bent into shape, its center inclosed in the stiffening-tube. Fig. 4 represents a ticket or tag which the fastener is designed to attach to cloth, &c. Fig. 5 is a top view of the fastener attaching a ticket to several sheets of cloth. Fig. 6 is a cross-section of Fig. 5, showing the shanks of the fastener run through the ticket and the cloth and bent apart on the bottom side of the cloth, binding them all together. Fig. 7 represents the wire head of the staple extended on one side in the form of a loop or ring, adapting the staple to hang or suspend upon a hook or nail the articles bound by it, or to be tied to a marking-tag by a string, as shown in Fig. 10. Fig. 8 represents the blank of the stiffening-tube provided with a center opening to be used on a staple with a looped head. In constructing the staple in this form the loop is formed in the center of the wire, and the ends of the wire are run through the center hole in the tube-blank and bent apart and the tube-blank folded around them, and their uncovered ends or shanks bent down at right angles from their covered center; or the blank of the center tube may be nicked or cut out at each side, as shown at Fig. 9, and folded around the staple-head, after the same has been bent into form, so that the neck of the loop will occupy the nicks or slots in the split side of the tube. Fig. 10 represents the staple having its head looped and tubed and a tag tied in its loop. Fig. 11 represents the staple-wire blank struck flat in its center. Fig. 12 represents the blank so struck bent into staple form; and Fig. 13 represents a staple with its head so flattened, having its flat head inclosed in a correspondingly-shaped tube to increase its stiffness and width.

Figure 14:
Figure 15:

The head of the staple may be made to project longitudinally beyond its shanks by making its center tube longer than the head formed by the folding of the wire, and providing the tube with two holes for the reception of the shanks of the staple, as shown in Fig. 14, and pinching the projecting ends of the tube, after the same has been closed on its head, as shown in Fig. 15.

What I claim as my invention is—

1. A double-pronged fastener or pin made of a single piece of flexible wire pointed at both ends, having its center portion inclosed in a metal tube and its ends bent down at right angles from its covered center, substantially in the manner and for the purposes herein set forth and described.

2. A double-pronged fastener or pin made of a single piece of flexible wire pointed at both ends, having its center portion provided with the loop *a* and inclosed in a metal tube and its ends bent down at right angles from its covered center, substantially in the manner and for the purposes herein set forth and described.

In testimony whereof I affix my signature in presence of two witnesses.

GEORGE W. McGILL.

Witnesses:
 HENRY SCOTT,
 W. R. NOÉ.